(12) United States Patent
Khosrowpour et al.

(10) Patent No.: US 12,316,511 B2
(45) Date of Patent: May 27, 2025

(54) DYNAMIC CONTROL OF NETWORK SPEED AT A SOLUTION LEVEL

(71) Applicant: DELL PRODUCTS L.P., Round Rock, TX (US)

(72) Inventors: Farzad Khosrowpour, Pflugerville, TX (US); Mitchell Markow, Hutto, TX (US); Travis North, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/499,897

(22) Filed: Nov. 1, 2023

(65) Prior Publication Data

US 2025/0141762 A1    May 1, 2025

(51) Int. Cl.
*H04L 41/5019*    (2022.01)
*H04L 41/147*    (2022.01)
*H04L 41/5009*    (2022.01)

(52) U.S. Cl.
CPC ........ *H04L 41/5019* (2013.01); *H04L 41/147* (2013.01); *H04L 41/5009* (2013.01)

(58) Field of Classification Search
CPC   H04L 41/5019; H04L 41/147; H04L 41/5009
See application file for complete search history.

(56) References Cited

U.S. PATENT DOCUMENTS

| | | | |
|---|---|---|---|
| 7,934,108 B2 * | 4/2011 | Radhakrishnan ... | G06F 11/3433 718/1 |
| 10,771,580 B1 | 9/2020 | Khosrowpour et al. | |
| 2022/0179706 A1 * | 6/2022 | Khosrowpour ..... | G06F 11/3466 |
| 2023/0063522 A1 * | 3/2023 | Vaknin ................. | H04W 16/18 |
| 2024/0171479 A1 * | 5/2024 | Malboubi ............ | H04B 7/0632 |

FOREIGN PATENT DOCUMENTS

| | | | | |
|---|---|---|---|---|
| EP | 4020204 B1 * | 5/2024 | ........... | G06F 1/3212 |
| WO | WO-2022250604 A1 * | 12/2022 | ............. | G06N 20/00 |
| WO | WO-2023052810 A1 * | 4/2023 | ......... | H04L 41/0816 |
| WO | WO-2024040976 A1 * | 2/2024 | | |

* cited by examiner

*Primary Examiner* — Philip C Lee
(74) *Attorney, Agent, or Firm* — Larson Newman, LLP

(57) ABSTRACT

An information handling system builds a performance model for a network based on key performance indicators, and evaluates performance of applications using the key performance indicators according to useability metrics. The system predicts network bandwidth requirement based on the performance model for the network and the performance of the applications, adjusts power consumption of the network based on the predicted network bandwidth requirement, and reallocates power saved from the adjusting of the power consumption of the network to a component of the information handling system.

13 Claims, 3 Drawing Sheets

DYNAMIC CONTROL OF NETWORK SPEED AT A SOLUTION LEVEL

FIELD OF THE DISCLOSURE

The present disclosure generally relates to information handling systems, and more particularly relates to dynamic control of network speeds.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system builds a performance model for a network based on key performance indicators, and evaluates performance of applications using the key performance indicators according to useability metrics. The system predicts network bandwidth requirement based on the performance model for the network and the performance of the applications, adjusts power consumption of the network based on the predicted network bandwidth requirement, and reallocates power saved from the adjusting of the power consumption of the network to a component of the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
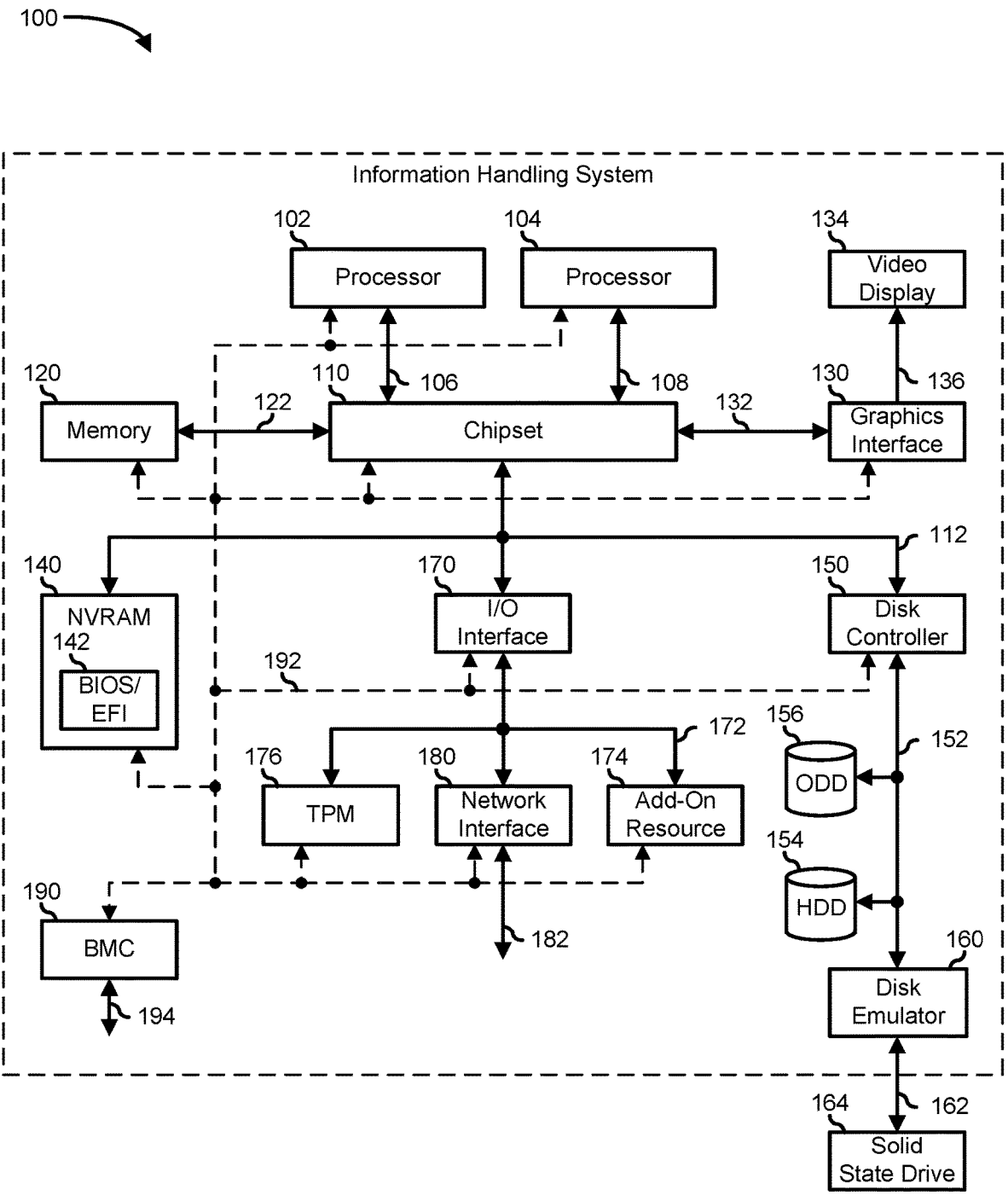
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (x4) PCIe adapter, an eight-lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board, or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device, a BMC may be referred to as an embedded controller (EC). A BMC included in a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include a $I^2C$ bus, a System Management Bus (SMBus), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Enterprise, a Dell EMC OpenManage Server Administrator (OMSA) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I²C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Browsers are increasingly used for user workloads as web applications supplant native applications. This may happen as computer frameworks move from client-based, to edge computing, then to a modern computing era which may be defined by a cloud distributed computing via orchestrated containers. The orchestrated containers may be connected by a network and intelligence that can determine whether to move workloads from one compute node to another compute node based on performance, cost, or security policies. To effectively distribute workloads from one compute node to another compute node and control dynamic network speed while optimizing the user's experience, there is a need for deeper telemetry and intelligence. For example, as the number of client compute nodes with high band fifth generation (5G) client communication devices increases and with each communication device consuming power ranging from two watts to fourteen watts, the total power consumption is expected to increase. The present disclosure includes a system and method to reduce the power consumption of the communication devices by controlling their network speed.

Figure 2:
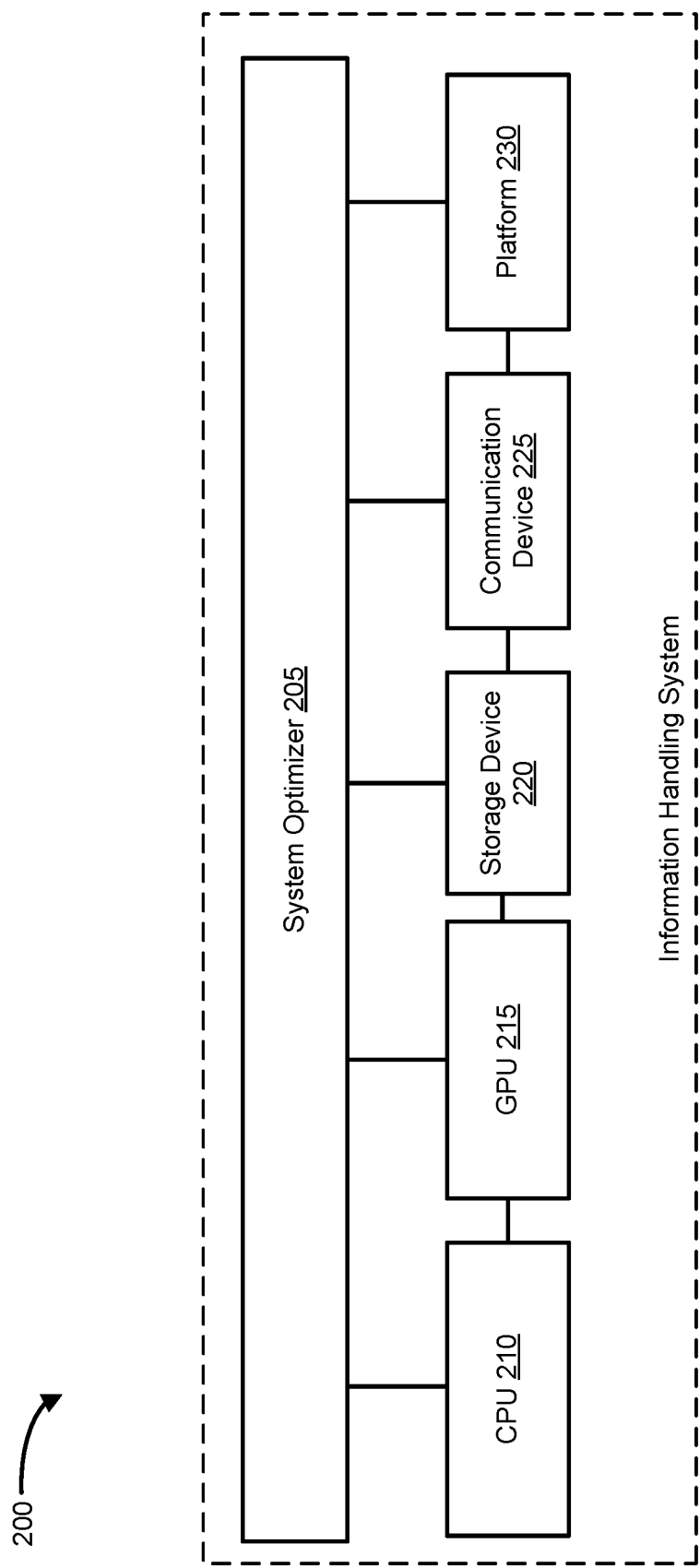
FIG. 2 is a block diagram of an information handling system configured for dynamic control of network speeds at a solution level, according to an embodiment of the present disclosure.

FIG. 2 shows an information handling system 200 configured with power-based dynamic control of network speed. Information handling system 200, which is similar to information handling system 100 of FIG. 1, includes a system optimizer 205 which may be configured to manage various components, such as a CPU 210, a graphics processing unit (GPU) 215, a storage device 220, a communication device 225, and a platform 230. CPU 210 may be similar to processor 102 or 104 of FIG. 1. Storage device 220 may be similar to ODD 156, HDD 154, or SSD 164 of FIG. 1. Communication device 225 may be similar to network interface 180 of FIG. 1 and can support various standards such as a fourth generation (4G), fifth generation (5G), or similar. Platform 230 may be a motherboard with a particular chipset, or similar. For each platform, the configuration may vary based on the type of processor, the processor generation, the amount of RAM, etc.

Information handling system 200 may operate as a mobile endpoint device of a network, such as a wide area network, a radio access network, etc. Accordingly, information handling system 200 may include one or more communication devices that may adhere to one or more standards, such as second generation, 4G, 5G, etc. Network requirements of the communication devices may vary over time. For example, data throughput may vary based on the currently running applications on a computing device. Certain applications may require higher bandwidth compared to others. Accordingly, the network requirements, such as network speed to maintain a certain level of data throughput, persistent connectivity, and other quality of service (QOS) requirements may change over time.

System optimizer 205 may be configured to intelligently and dynamically optimize the performance of various components of information handling system 200 by using artificial intelligence and machine learning. Thus, improving user experience. In one embodiment, system optimizer 205 may dynamically optimize the network subsystem, which increases user productivity. System optimizer 205 dynamically and intelligently controls network subsystem speed by controlling the network speed of one or more components of information handling system 200, such as communication device 225. For example, increasing the network speed of communication device 225 when executing bandwidth-intensive applications, such as when a user is using a teleconference application.

System optimizer 205 may optimize the performance of the network subsystem through system usage analysis and learning. The system usage analysis may be performed by monitoring dynamic platform telemetry data and QoS parameter values associated with one or more components of the information handling system. For example, system optimizer 205 may collect the amount of power being consumed, temperature, application latency, performance statistics, etc. from CPU 210, GPU 215, storage device 220, communication device 225, platform 230, and other components.

System optimizer 205 may be configured to evaluate customer preferences, workload, bandwidth, and system conditions based on the collected data. System optimizer 205 may then use machine learning technology to make predictions and adjust system settings to optimize the users' experience. For example, system optimizer 205 may include a trained classifier that uses a machine learning algorithm, such as Random Forest, Neural Network, or the like to generate predictions. For example, system optimizer 205 may be configured to dynamically predict the maximum network bandwidth required for a given user experience which includes runtime, performance, and cost. System optimizer 205 may also be configured to predict network workload and adjust network speed to optimize the user experience based on the user intent. The user intent may be reflected by a selected user profile.

Based on the network bandwidth predictions, system optimizer 205 may perform adjustments to network resources according to a set of rules and/or policies. In one example, system optimizer 205 may control network speed while maintaining the desired user experience. The power reallocation includes dynamically lowering the network card speed when bandwidth is not critical. This in turn reduces power allocated to the network subsystem. Thus, allowing the power to be used by the other components instead.

For example, if the network bandwidth is predicted to be low, then the network speed may be lowered. Accordingly, if the network bandwidth is predicted to be high, then the network speed may be increased. Lowering the network speed may also reduce the power consumption of communication device 225 which frees up power that can be reallocated to the other components of information handling system 200, such as CPU 210, GPU 215, storage device 220, and platform 230. The reallocation may be based on current requirements of the components and/or user preference. In one embodiment, the available power can be reallocated to one or more components based on priority, power capacity of the component, power limit, etc. For example, if the user is currently running a GPU-intensive application, then the power savings may be reallocated to GPU 215. Reallocating the available power of the network subsystem because of the adjustment may ensure an increase in power allocation to the other components of the information handling system.

Those of ordinary skill in the art will appreciate that the configuration, hardware, and/or software components of information handling system 200 depicted in FIG. 2 may vary. For example, system optimizer 205 may instead be included as part of an embedded controller of information handling system 200, wherein the embedded controller is similar to BMC 190 of FIG. 1. The illustrative components within information handling system 200 are not intended to be exhaustive but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Figure 3:
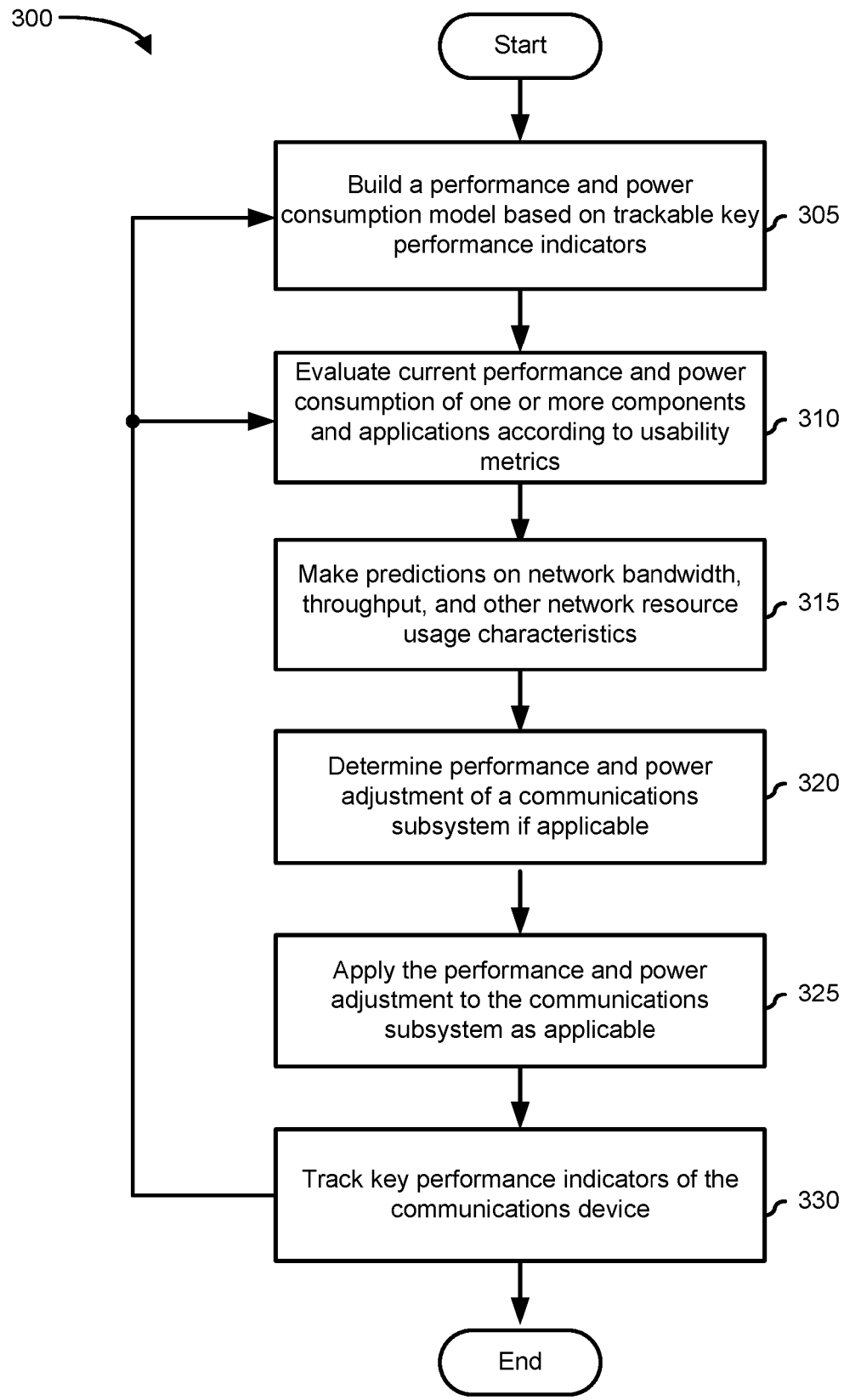
FIG. 3 is a flowchart of a method for dynamic control of network speed at a solution level, according to an embodiment of the present disclosure.

FIG. 3 shows a flowchart of a method 300 for dynamic control of network speed at a solution level. Method 300 may be performed by one or more components of information handling system 200 of FIG. 2. However, while embodiments of the present disclosure are described in terms of system optimizer 205 of FIG. 2, it should be recognized that other systems may be utilized to perform the described method. One of skill in the art will appreciate that this flowchart explains a typical example, which can be extended to advanced applications or services in practice.

Method 300 typically starts at block 305 where the system optimizer may build a performance model and/or a power consumption model for the network that may have been trained based on trackable key performance indicators. The key performance indicators comprise producer and consumer variables that include CPU and memory utilization, application latency, system telemetry, power consumption, temperature value, performance metrics, QoS hints, and platform telemetry data, among others. The QoS hints include one or more parameters that indicate a desired QoS. For example, a QoS hint may include a latency property of low, medium, or high in an ordered list. The method may proceed to block 310.

At block 310, the system optimizer may evaluate the current performance, power consumption, and/or other parameters of one or more components and applications versus useability parameters according to user preference. The evaluation may be based on the tracked key performance indicators. In addition, the performance and power consumption model built earlier may be used as an input in the evaluation. The current performance can be determined by measuring application runtime, application performance counters, instructions per cycle CPU utilization, and the like. The power consumption of various components can be estimated based on sensor readings, such as temperature readings. For example, the power consumption of the communication device can be estimated based on its temperature. The useability parameters may include desired acoustics versus performance, or other conditions, such as increased runtime. The method may proceed to block 315.

At block 315, the system optimizer may make one or more predictions regarding network bandwidth, throughput, and other network resource requirements based on usage characteristics according to the evaluation and the performance and power consumption model built earlier. For example, the system optimizer may predict the network bandwidth required for a given user experience, computer usage pattern, etc. The predictions may be used to proactively and/or reactively manage network resources and other components of the information handling system to avoid undesirable states that may negatively impact the performance of the workload. The method may proceed to block 320.

At block 320, the system optimizer may determine whether to perform an adjustment regarding the performance and/or power consumption of the network subsystem including the communications device in orchestration with demands of other devices and applications on the network. For example, the system optimizer may determine whether to accelerate or decelerate the performance and/or power consumption of the communications device. The system optimizer may use a set of rules or policies for the determination. In addition, the system optimizer may also use the performance model to predict an amount of adjustment if any. For example, if the system optimizer determines to reduce the power consumption of the communications network, the performance model may help in predicting the reduction in watts. The performance and/or power consumption of other components or resources associated with the network subsystem, such as an antenna, may also be adjusted. The method may proceed to block 325.

At block 325, the system optimizer may perform adjustments to maintain the best user experience based on the user's intent. For example, the system optimizer may accelerate or decelerate the performance and/or power consumption of the communication device based on the recommendation. In addition, adjusting the performance and power consumption of the communication device may be limited by performance and/or power QoS thresholds. For example, accelerating the performance and/or power consumption may not be performed if doing so would increase the performance and/or the power consumption of the communication device above a pre-determined upper limit or threshold based on user preference. On the other hand, slowing down the performance or reallocating the power consumption of the communication device may not be performed if doing so would drop the performance or power allocated to the communication device below a pre-determined lower limit threshold that may also be according to the user intent or preference.

In information handling systems with limited power and/or thermal capabilities, such as mobile computing devices, the communication device(s) may be capped at certain performance and/or power limits. For example, adjustment of the power consumption of the communication device(s) may be capped according to a QoS threshold. Available power outside of the power limits may be reallocated to other components of the information handling system. In another embodiment, the system optimizer may increase or decrease the network speed according to performance limitations. However, the network speed may not be increased above a maximum limit. Accordingly, the network speed may not be decreased below a minimum threshold. The maximum and minimum thresholds may vary based on the user's intent and limitations of the information handling system. The adjustment to the network speed may decrease or increase its power consumption accordingly. Similarly, available power that was saved based on the reduction of the power consumption of the communication device may be reallocated to the other components. The method may proceed to block 330.

At block 330, the system optimizer may track key performance indicators of the applications, communication devices, and other components of the information handling system. For example, key performance indicators of the communication device being tracked may include peak data rate, network latency, cell edge data rate, cell spectral efficiency, mobility, cost efficiency, simultaneous connection, etc. Other key performance indicators that can be tracked include resource utilization of the applications. The key performance indicators can be measured at different network points. The collected key performance indicator data may then be used to identify resource-intensive applications. The data associated with the tracked key performance indicators may be used by the system optimizer with the evaluation at block 310 and in training the performance and power consumption model at block 305.

Although FIG. 3 shows example blocks of method 300 in some implementations, method 300 may include additional blocks, fewer blocks, different blocks, or differently arranged blocks than those depicted in FIG. 3. Those skilled in the art will understand that the principles presented herein may be implemented in any suitably arranged processing system. Additionally, or alternatively, two or more of the blocks of method 300 may be performed in parallel. For example, blocks 310 and 325 of method 300 may be performed in parallel, such as while the system optimizer is performing the evaluation, the system optimizer may continue tracking key performance indicators to be used in the next evaluation.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. An information handling system, comprising:
    a processor; and
    a memory storing code that when executed causes the processor to perform operations including:
        building a performance model for a network based on key performance indicators;
        evaluating performance of applications using the key performance indicators according to useability metrics;
        predicting network bandwidth requirement based on the performance model for the network and the performance of the applications;
        adjusting power consumption of the network based on the predicted network bandwidth requirement; and
        reallocating power saved from the adjusting of the power consumption of the network to a component of the information handling system.

2. The information handling system of claim 1, wherein the adjusting of the power consumption of the network is capped according to a quality of service threshold.

3. The information handling system of claim 1, wherein the adjusting of the power consumption of the network includes decreasing the power consumption of a communication device.

4. The information handling system of claim 1, wherein the operations further comprise controlling network speed of a communication device.

5. The information handling system of claim 1, wherein the operations further comprise tracking the key performance indicators.

6. The information handling system of claim 1, wherein the operations further comprise evaluating user preferences and system conditions of the information handling system.

7. The information handling system of claim 1, wherein the operations further comprise predicting network bandwidth for a user experience.

8. A non-transitory computer-readable medium to store instructions that are executable to perform operations comprising:
    building a performance model for a network based on key performance indicators;
    evaluating performance of applications using the key performance indicators according to useability metrics;
    predicting network bandwidth requirement based on the performance model for the network and the performance of the applications;
    adjusting power consumption of the network based on the predicted network bandwidth requirement; and
    reallocating available power from the adjusting power consumption of the network to a component of an information handling system.

9. The non-transitory computer-readable medium of claim 8, wherein the adjusting of the power consumption of the network is capped according to a quality of service threshold.

10. The non-transitory computer-readable medium of claim 8, wherein the adjusting of the power consumption of the network includes decreasing the power consumption of a communication device.

11. The non-transitory computer-readable medium of claim 8, wherein the operations further comprise controlling network speed.

12. The non-transitory computer-readable medium of claim 8, wherein the operations further comprise evaluating user preferences and system conditions of the information handling system.

13. The non-transitory computer-readable medium of claim 8, wherein the operations further comprise tracking the key performance indicators.

* * * * *